United States Patent
Bamsch et al.

(10) Patent No.: US 10,147,075 B2
(45) Date of Patent: Dec. 4, 2018

(54) FORCED VIRTUAL MACHINE WARM-UP

(71) Applicant: PAYPAL, INC., San Jose, CA (US)

(72) Inventors: Brian Bamsch, San Lorenzo, CA (US); Krishnakumar Balasubramanian, San Jose, CA (US); Tim Craig, San Jose, CA (US); Ray Tai, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 78 days.

(21) Appl. No.: 15/198,356

(22) Filed: Jun. 30, 2016

(65) Prior Publication Data

US 2018/0004557 A1     Jan. 4, 2018

(51) Int. Cl.
| | |
|---|---|
| *G06F 9/44* | (2018.01) |
| *G06Q 20/10* | (2012.01) |
| *G06F 9/54* | (2006.01) |
| *G06Q 20/02* | (2012.01) |
| *G06Q 20/40* | (2012.01) |
| *G06F 9/455* | (2018.01) |

(52) U.S. Cl.
CPC ......... *G06Q 20/102* (2013.01); *G06F 9/4552* (2013.01); *G06F 9/54* (2013.01); *G06Q 20/02* (2013.01); *G06Q 20/405* (2013.01); *G06F 2009/45595* (2013.01)

(58) Field of Classification Search
CPC ............ G06F 9/45508; G06F 9/45558; G06F 2009/45575; G06F 2009/45583; G06F 9/4552; G06F 9/54; G06F 2009/45595; G06Q 20/02; G06Q 20/102; G06Q 20/405
USPC ................................................. 717/138–148
See application file for complete search history.

(56) References Cited

U.S. PATENT DOCUMENTS

| | | | | |
|---|---|---|---|---|
| 7,587,368 B2* | 9/2009 | Felsher | ................. | G06F 19/322 123/620 |
| 7,707,641 B2* | 4/2010 | Schmeidler | ............. | G06F 21/10 380/201 |
| 7,805,344 B2* | 9/2010 | Smith | .................... | G06Q 20/10 705/35 |

(Continued)

OTHER PUBLICATIONS

Tal Galili, "Speed up your R code using a just-in time (JIT) compiler", Apr. 2012, R-statistics blog, 13 pages.*

(Continued)

*Primary Examiner* — Ted T. Vo
(74) *Attorney, Agent, or Firm* — Haynes and Boone, LLP.

(57) ABSTRACT

The systems and methods that warm-up a virtual machine are provided. An application byte code is generated from an application source code for an application that processes time-sensitive messages using a virtual machine. The virtual machine is configured to interpret the application byte code. A warm-up data is received by the virtual machine. The warm-up data is configured to emulate one or more time-sensitive messages processed by the virtual machine. From the warm-up data, the virtual machine generates application machine-readable code from the application byte code, and stores the application machine-readable code. After the virtual machine generates the application machine-readable code, a computing device that includes the virtual machine is placed in a real-world environment and begins to receive the time-sensitive messages. The virtual machine processes the time-sensitive messages using the generated application machine-readable code.

20 Claims, 5 Drawing Sheets

(56) References Cited

U.S. PATENT DOCUMENTS 8,676,161 B2 * 3/2014 Phillips .............. G06Q 20/3226
455/410

OTHER PUBLICATIONS

Margaret Rouse, "just-in-time compiler (JIT)", Apr. 2005, Definition from WhatIs.com, 4 pages.*
Barthe et al., "Preventing Timing Leaks Through Transactional Branching Instructions", 2006, Electronic Notes in Theoretical Computer Science 153, pp. 33-55.*

* cited by examiner

FORCED VIRTUAL MACHINE WARM-UP

TECHNICAL FIELD

The disclosure generally relates to processing messages, and more specifically to decreasing latency for processing messages on a virtual machine.

BACKGROUND

Many applications that process data are sensitive to the amount of time the application takes to process the data. For instance, when an application takes too long to process data, another application or computing device that requested the data may time out and determine that the data cannot be processed.

In a platform that interprets application source code using a virtual machine, one way to expedite data processing is to compile frequently used sections of the application source code into machine-readable code. The virtual machine can then re-use the machine readable code in subsequent transactions. However, when the application first begins to execute, the machine-readable code is not yet compiled, and the application continues to encounter processing overhead when it processes data. This processing overhead can cause the application to time-out when application processes time sensitive data.

Figure 1:
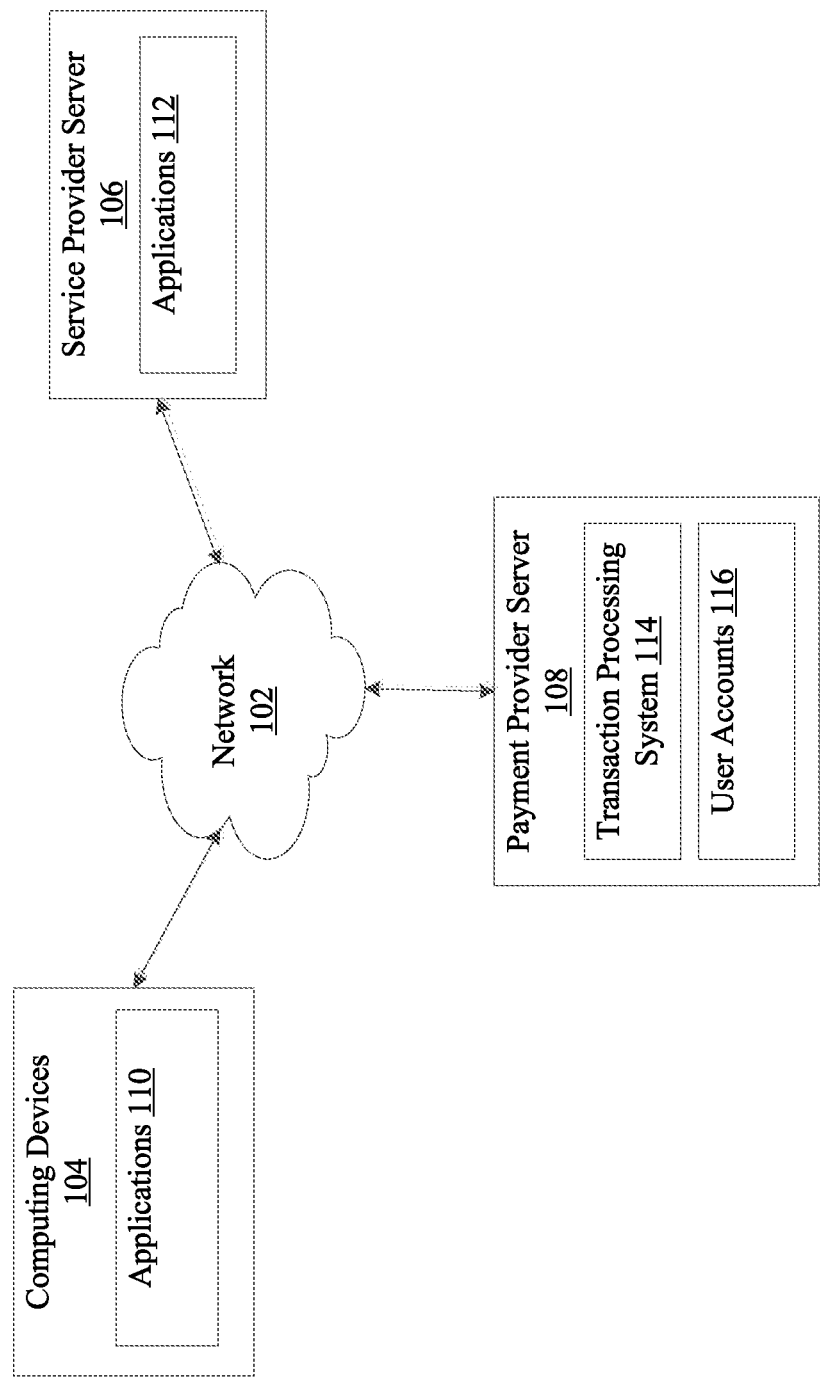
FIG. 1 is a block diagram of a system where embodiments can be implemented.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The disclosure provides systems and methods that reduce overhead of a virtual machine that processes transactions. The virtual machine that executes on a computing device processes numerous transactions and data included in these transactions. These transactions may be generated by numerous applications in a real-world environment and may be time-sensitive. Transactions are time-sensitive when transactions can time out and, as a result, be deemed invalid by other applications.

When a virtual machine interprets applications that process these transactions, the virtual machine incurs processing overhead. The processing overhead occurs because the virtual machine interprets each line of non-compiled application byte code in the execution path of each transaction. To reduce overhead incurred as a result of the transaction processing, the virtual machine may compile the application byte code located in the execution paths of transactions into the machine-readable code. The virtual machine may then reuse the machine-readable code to process subsequent transactions.

However, time-sensitive transactions that cause the virtual machine to compile code may still time out when the virtual machine compiles the application byte code for the first time. In this case, the virtual machine may process transactions that include warm-up data before the computing device that hosts the virtual machine is placed into a real-world environment. The warm-up data includes data that does not affect transactions between applications in the real-world environment, but that may be configured to cause the virtual machine to compile the frequently processed sections of the application byte code into the machine-readable code before the virtual machine begins to process real-world transactions.

Once the virtual machine compiles the machine-readable code using the warm-up data, the virtual machine may be added into the real-world environment to process the real-world transactions.

FIG. 1 is an exemplary system 100 where embodiments can be implemented. System 100 includes a network 102. Network 102 may be implemented as a single network or a combination of multiple networks. For example, in various embodiments, network 102 may include the Internet or one or more intranets, landline networks, wireless networks, and/or other appropriate types of networks. Network 102 may be a small scale communication network, such as a private or local area network, or a larger scale network, such as a wide area network, accessible by the various components of system 100.

Various components that are accessible to network 102 may be computing devices 104, service provider server(s) 106, and payment provider server(s) 108. Computing devices 104 may be portable and non-portable electronic devices under control of a user and configured to transmit, receive, and manipulate data from service provider server(s) 106 and payment provider server(s) 108 over network 102. Example computing devices 104 include desktop computers, laptop computers, tablets, smartphones, wearable computing devices, eyeglasses that incorporate computing devices, implantable computing devices, etc.

Computing devices 104 may include one or more applications 110. Applications 110 may be pre-installed on the computing devices 104, installed on the computing devices 104 using portable memory storage devices, such as compact disks or thumb-drives, or be downloaded to the computing devices 104 from service provider server(s) 106. Applications 110 may be executed on the computing devices 104 and receive instructions and data from a user, from service provider server(s) 106, and payment provider server(s) 108.

Example applications 110 installed on computing devices 104 may be payment transaction applications. Payment transaction applications may be configured to transfer money world-wide, receive payments for goods and services, manage money spending, etc. Further, applications 110 may be under an ownership or control of a payment service provider, such as PAYPAL®, Inc. of San Jose, Calif., USA, a telephonic service provider, a social networking service provider, and/or other service providers. Applications 110 may also be analytics applications. Analytics applications perform business logic, provide services, and measure and improve performance of services and functions of other applications that execute on computing devices 104 based on current and historical data. In another embodiment, applications 110 may be security applications for implementing client-side security features, programmatic client applications for interfacing with appropriate application programming interfaces (APIs) over network 102, communication applications, such as email, texting, voice, and instant messaging applications that allow a user to send and receive emails, calls, texts, and other notifications through network 102. In yet another embodiment, applications 110 may be location detection applications, such as a mapping, compass, and/or global positioning system (GPS) application. Further, applications 110 may be social networking applications and/or merchant applications. In yet another embodiment, applications 110 may be service applications that permit a user of computing device 104 to receive, request and/or view information for products and/or services, and also permit the user to purchase the selected products and/or services.

In an embodiment, applications 110 may utilize numerous components included in computing device 104 to display, receive input, store data, and communicate with network 102. Example components are discussed in detail in FIG. 5.

As described above, one or more service provider servers 106 is also connected to network 102. Service provider server 106 may be an application executing on a computing device that provides services to a user using applications 110 that execute on computing devices 104. Service provider server 106 may also be maintained by a service provider, such as PAYPAL®, a telephonic service provider, social networking service, and/or other service providers.

In an embodiment, service provider server 106 stores and executes applications 112. Applications 112 may be counterparts to applications 110 executing on computing devices 104 and may receive, process, and transmit data for user requested products and/or services transmitted from applications 110. Thus, applications 112 may also be financial services applications configured to transfer money worldwide, receive payments for goods and services, manage money spending, etc. In an embodiment, applications 112 may also be security applications configured to implement client-side security features or programmatic client applications for interfacing with appropriate application programming interfaces (APIs) over network 102. In another embodiment, applications 112 may be communication applications that perform email, texting, voice, and instant messaging functions that allow a user to send and receive emails, calls, texts, and other notifications over network 102. In yet another embodiment, applications 112 may be location detection applications, such as a mapping, compass, and/or GPS applications. In yet another embodiment, applications 112 may also be incorporated into social networking applications and/or merchant applications.

In an embodiment, when applications 110 transmit requests and/or data for different transactions to applications 112, applications 112 process these transactions. The transactions may be in a form of one or more messages that are transmitted over network 102. In a further embodiment, to process transactions on applications 112, service provider server 106 may request payment from a user using application 110 via payment provider server 108. For instance, the payment provider server 108 may receive transactions from applications 110, 112 that cause the payment provider server 108 to transfer funds of a user using application 110 to service provider associated with service provider server 106.

In an embodiment, payment provider servers 108 may be maintained by a payment provider, such as PAYPAL®. Other payment provider servers 108 may be maintained by or include a merchant, financial services provider, credit card provider, bank, and/or other payment provider, which may provide user account services and/or payment services to a user. Although payment provider servers 108 are described as separate from service provider server 106, it is understood that one or more of payment provider servers 108 may include services offered by service provider server 108 and vice versa.

Each payment provider server 108 may include one or more processing applications, such as a transaction processing system 114. Transaction processing system 114 may correspond to processes, procedures, and/or applications executable by a hardware processor. In an embodiment, transaction processing system 114 may be configured to receive information from one or more applications 110, 112 executing on computing devices 104 and/or service provider server 106 for processing and completion of financial transactions. Financial transactions may include financial information corresponding to user debit/credit card information, checking account information, a user account (e.g., payment account with a payment provider server 108), or other payment information. Transaction processing system 114 may complete the financial transaction for the purchase request by providing payment to application 112 executing on service provider server 106. In various embodiments, transaction processing system 114 may provide transaction histories, including receipts, to computing device 104 in order to provide proof of purchase for an item and/or service.

Payment provider server 108 may also include user accounts 116. Each user account 116 may be established by one or more users using application 110 with payment provider server 108 to facilitate payment for goods and/or services offered by applications 112. User accounts 116 may include user information, such as name, address, birthdate, payment/funding information, travel information, additional user financial information, and/or other desired user data. In a further embodiment, user accounts 116 may be stored in a database or another memory storage described in detail in FIG. 5.

Figure 2:
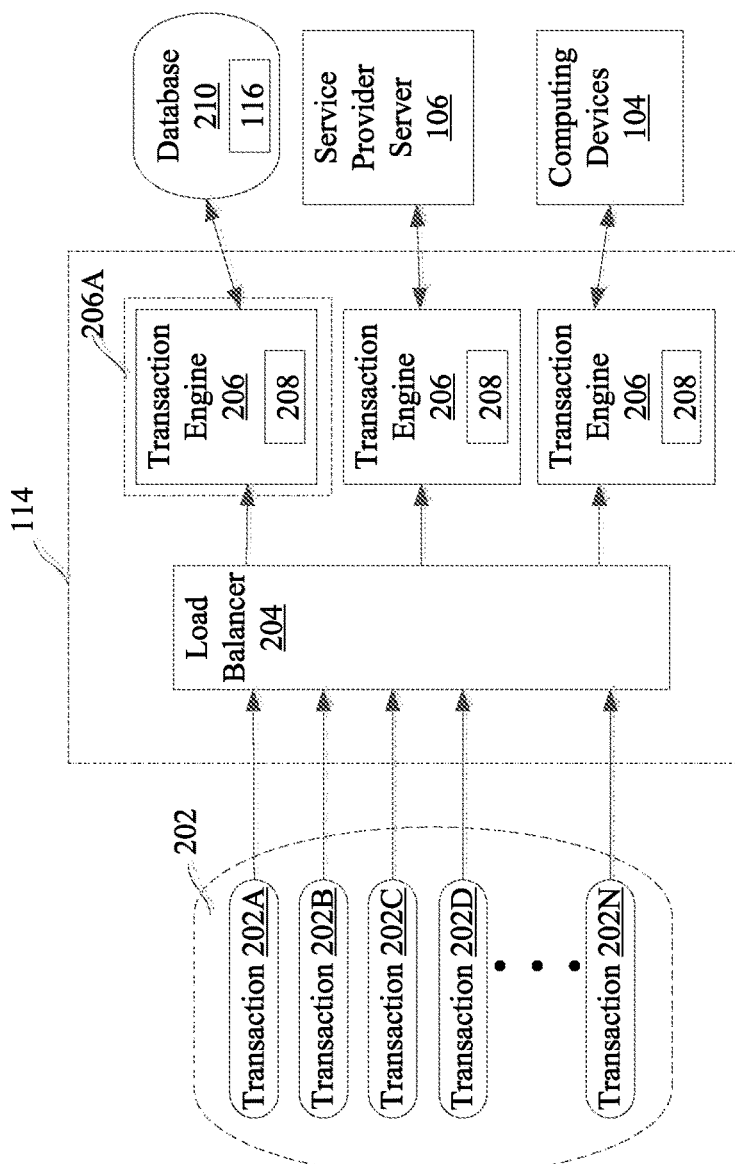
FIG. 2 is a block diagram of a system processing data, according to an embodiment.

In an embodiment, application 110 may send message requests or transactions to service provider server 106 and/or payment provider server 108. These message requests may be payment transactions for goods and/or services provided or rendered by a service provider over applications 112. In an embodiment, transaction processing system 114 may receive message requests either directly from computing device 104 or via service provider server 106. FIG. 2 is a block diagram 200 of a system that processes messages, according to an embodiment. Example system 200 may be a payment transaction system 114, or a system that includes one or more components described in FIG. 2, though an implementation is not limited to this embodiment.

As illustrated in FIG. 2, system 200 receives messages, which can be transactions 202A-N, collectively referred to as transactions 202. Example transactions 202 may be payment transactions that include payment information for goods and/or services rendered to a user using application 110, though implementation is not limited to this embodiment. In a further embodiment, transactions 202A-N may be time-sensitive transactions for which system 200 may be allocated a preconfigured amount of processing time for processing, before applications 110, 112 may deem transactions 202A-N as timed-out and/or invalid.

To expedite processing of transactions 202A-N, payment transaction system 114 may include a load balancer 204. Load balancer 204 distributes transactions 202 to multiple instances of transaction engines 206 for processing. Load balancer 204 may distribute transactions 202A-N according to a load distribution algorithm that distributes transactions 202A-N to multiple instances 206 to expedite processing of time-sensitive data. In this way, a single transaction engine 206 may not be overloaded with numerous transactions 202 while other transaction engines 206 remain idle. Further, different transaction engines 206 may be swapped in and out of load balancer 204 when, for example, transaction engine 206 may be upgraded with new applications, new versions of the applications, etc., or when another transaction engine 206 is added to increase transaction 202 throughput, etc.

In an embodiment, transaction engine 206 processes transactions 202. As part of the processing, transaction engine 206 may identify a user associated with user account 116 that requests a transaction which may be stored in database 210. Based on the user criteria stored in user account 116, transaction engine 206 may or may not authorize the transaction. Transaction engine 206 may also communicate with service provider server 106 to retrieve additional data and/or information associated with goods and/or services offered by application 112. In a further embodiment, transaction engine 206 may also communicate with computing device 104 regarding whether transactions 202A-N have been authorized.

In an embodiment, one or more transactions 202A-N processed by the transaction engine 206 may be time-sensitive. Time-sensitive transactions are transactions 202 that may time out and be considered invalid by other components in the system 200 when transactions 202 are processed by the transaction engine 206 for longer than a preconfigured amount of time. One way to expedite the processing of transactions 202 is to generate algorithms that are efficient at processing transactions 202. Another way is to configure architecture of the transaction engine to streamline processing of transactions 202 that are frequently processed by the transaction engine 206. In yet another embodiment, transaction engine 206 may process a set of "warm-up" transactions that streamline processing of transactions 202 before transaction engine 206 is added to the load balancer 204. In this way, transaction engine 206 may already be streamlined to process transactions 202 when added to load balancer 204 and eliminates the time overhead that may be required to streamline processing of transactions 202 on the transaction engine 206.

In an embodiment, each transaction engine 206 may include a virtual machine 208. Virtual machine 208 controls the processing of transactions 202 within each transaction engine 206. In a further embodiment, virtual machine 208 may be a Java Virtual Machine (JVM), though the implementation is not limited to this embodiment.

Figure 3:
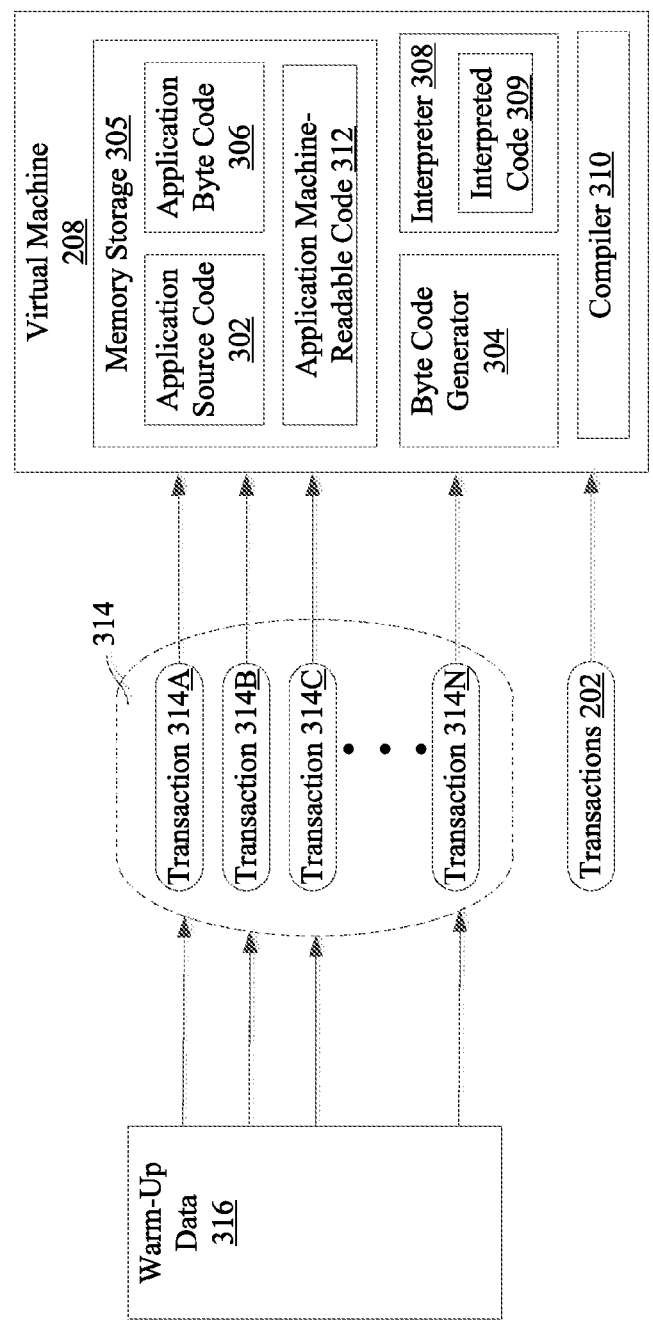
FIG. 3 is a block diagram of a system that optimizes message processing on a virtual machine, according to an embodiment.

FIG. 3 is a block diagram 300 of a system that optimizes message processing on a virtual machine, according to an embodiment. As discussed above, the one or more messages may include each transaction 202. Although block diagram 300 describes transaction processing with respect to the transaction engine 206, the embodiments described below may be applied to any computing components discussed in FIG. 1 that include a virtual machine that executes application(s).

As discussed above, virtual machine 208 processes transactions 202 that load balancer 204 assigns to transaction engine 206. To process transactions 202, virtual machine 208 includes one or more applications. The one or more applications may be stored as application source code 302. In an embodiment, virtual machine 208 may store application source code 302 in a memory storage 305. Memory storage 305 may be an example memory that is described in detail in FIG. 5.

In an embodiment, application source code 302 may be human-readable code written in an interpreted programming language such as Java, C#, Python, PHP, Tcl, Forth, Smalltack, etc. Applications written in the interpreted programming language are not compiled into machine-readable code prior to execution and are not executed by a processor (such as a processor included in FIG. 5). Instead, virtual machine 208 interprets and executes sections of the application byte code 306 that are invoked by transactions 202 once the virtual machine 208 receives transactions 202 or "on-the-fly" and without previous compilation into a machine-readable code. One of the benefits of application written in an interpreted language is that one version of application source code 302 may be downloaded onto computing devices having different platforms, such as Unix, Linux, or Windows platforms. The virtual machine 208 executing on the platform of the computing device that receives transaction 202 may then interpret the application source code 302 according to the semantics stipulated by the platform and process transactions 202.

In an embodiment, virtual machine 208 may include a byte code generator 304. Byte code generator 304 may transform application source code 302 into application byte code 306. The application byte code 306 is an instruction set that virtual machine 208 uses to execute sections of application invoked by transactions 202. Unlike application source code 302 that is written in a human-readable form, the byte code generator 304 generates application byte code 306 as a set of system abstracted compact numeric codes, constants, references to other sections of the byte code, operation codes, etc. In a further embodiment, byte code generator 304 may generate application byte code 306 from application source code 302 prior to the virtual machine receiving transactions 202 and store application byte code 306 in the memory storage 305.

In an embodiment, virtual machine 208 includes an interpreter 308. Interpreter 308 interprets application byte code 306 into machine-readable code once virtual machine 208 receives transaction 202. The sections of application byte code 306 that interpreter 308 interprets are the sections that are in the execution path of the transactions 202. To interpret application byte code 306, interpreter 308 reads each line from the sections of the application byte code 306 that are invoked by transaction 202 and generates interpreted code 309 from application byte code 306.

In an embodiment, sections of application byte code 306 that are invoked by transactions 202 are in the execution path of the transactions 202. The execution path may be different for different transactions 202 or different data values in the transactions 202.

Once interpreter 308 generates interpreted code 309, the virtual machine 208 may execute the interpreted code 309 and process the transactions 202 using the interpreted code 309. In a further embodiment, interpreter 308 discards interpreted code 309 after virtual machine 208 completes processing transaction 202. In this case, interpreter 308 generates new interpreted code 309 each time virtual machine 208 receives transactions 202.

In an embodiment, because, interpreter 308 generates interpreted code 309 when virtual machine 208 receives each transaction 202, the interpreted code 309 is compatible with the computer platform on which the interpreted code 309 is executed. However, because interpreter 308 generates interpreted code 309 "on-the-fly," virtual machine 208 accumulates time overhead during which interpreter 308 generates the interpreted code 309. The time overhead associated with interpreter 308 may cause transactions 202 to time-out while virtual machine 208 processes the transactions. In this case, computing devices 104, service provider server 106 and/or database 210 discussed in FIGS. 1 and 2 may determine that one or more transactions 202 are invalid.

To eliminate overhead associated with interpreter 308, virtual machine 208 may include compiler 310. In an embodiment, compiler 310 may generate application machine-readable code 312 from application byte code 306. In a further embodiment, compiler 310 may generate application machine-readable code 312 when virtual machine 208 receives transactions 202. In this case, compiler 310 generates application machine-readable code 312 from application byte code 306 that is in the execution path of transactions 202. Notably, compiler 310 changes application byte code 306 from being interpreted to being compiled.

In an embodiment, the application machine-readable code 312 generated by compiler 310 may be stored in memory storage 305, and may also be subsequently reused by virtual machine 208 for other transactions 202 that include the same execution path or sections of the execution path. For example, when application machine-readable code 312 is invoked by different transactions 202, virtual machine 208 may re-use application machine-readable code 312 stored in memory storage 305, instead of generating new application machine-readable code 312 using compiler 310 or interpreted code 309 using interpreter 308. In this way, virtual machine 208 may reduce the time overhead required to interpret application byte code 306 by the interpreter 308.

In a further embodiment, virtual machine 208 may include a flag or a variable that may be set by a system administrator and that may indicate to the virtual machine 208 to compile application byte code 306 into application machine-readable code 312 using a compiler 310 or into interpreter code 309 using interpreter 308. For example, when the flag or the variable is set, virtual machine 208 may use a compiler 310, instead of interpreter 308, to generate application machine-readable code 312 from sections of application byte code 306 that are part of the execution path of transaction 202.

In an embodiment, when compiler 310 compiles application machine-readable code 312 that is in the execution path of transaction 202, virtual machine 208 may still experience transaction processing delay for these transactions 202 the first time compiler 310 compiles application machine-readable code 312. To further expedite transaction processing, virtual machine 208 may receive and process transactions 314A-N, collectively referred to as transactions 314 prior to processing transactions 202. In an embodiment, transactions 314 are transactions that are not associated with the real-world environment described in FIG. 1. Instead, transactions 314 include warm-up data 316 that emulates transactions 202 without affecting application 110, 112, and user accounts 116. The warm-up data 316 may cause compiler 310 to compile sections of application byte code 306 that are in the execution path of warm-up data 316 into application machine-readable code 312 before virtual machine 208 begins processing transactions 202 generated by applications 110 and/or 112. Further, the warm-up data 316 may then be configured to invoke sections of application byte code 306 that are frequently used by transactions 202. In this way, when virtual machine 208 receives transactions 202 from the real-world environment described in FIG. 1, the application machine-readable code 312 may include sections of application byte code 306 that are in the execution path of transactions 202, and virtual machine 208 may execute transactions 202 without incurring time overheard caused by interpreter 308 or compiler 310.

In an embodiment, virtual machine 208 may receive transactions 314 upon start-up or initialization of virtual machine 208. In another embodiment, virtual machine 208 may receive transactions 314 when application source code 302 is installed or upgraded in memory storage 305. For instance, suppose application source code 302 is upgraded on transaction engine 206A shown in FIG. 2. Prior to the upgrade, transaction engine 206A may be removed from load balancer 204. Once removed, system administrator or an external script may install application source code 302 in the memory storage 305. Following the installation, virtual machine 208 of transaction engine 206A may generate application byte code 306 from the installed application source code 302. Next, virtual machine 208 may receive transactions 314A-N that include warm-up data 316. Transactions 314A-N and warm-up data set 316 may cause compiler 310 to generate application machine-readable code 312 for sections of application byte code 306 that are in the execution path of transactions 314A-N. After compiler 310 generates application machine-readable code 312, transaction engine 206A may be added to the load balancer 204 shown in FIG. 2. In this way, transaction engine 206A may use application machine-readable code 310 generated by transactions 314 to process transactions 202 from applications 110, 112 and reduce time overhead and delay due to compiler 310 compiling application byte code 306 and/or interpreter 308 interpreting application byte code 306.

In an embodiment, when one of transactions 202, such as transaction 202B invokes an execution path in application byte code 306 for which application machine-readable code 312 has not been generated, interpreter 308 may generate interpreted code 309 to process transaction 202B or compiler 310 may generate machine-readable code 312 to process transaction 202B, and then store the machine-readable code 312 in memory storage 305.

Figure 4:
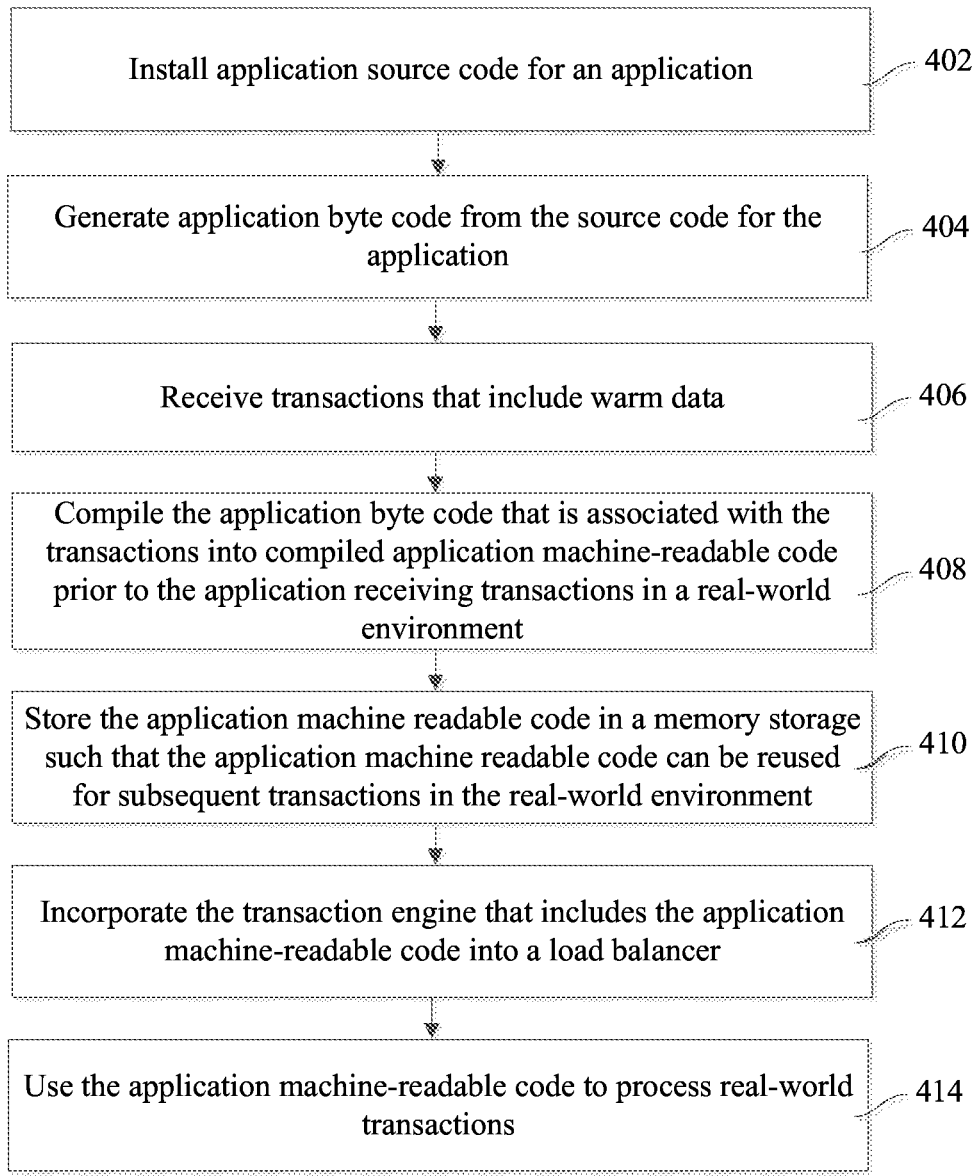
FIG. 4 is a flowchart of a method for warming up a virtual machine for message processing, according to an embodiment.

FIG. 4 is a flowchart of a method 400 for warming up a virtual machine for message processing, according to an embodiment. Method 400 may be performed using hardware and/or software components described in FIGS. 1-4. Note that one or more of the operations may be deleted, combined, or performed in a different order as appropriate. Further, additional operations may be performed at various stages of the method. In an embodiment, prior to operation 402, transaction engine 206A may be removed from load balancer 204.

At operation 402, an application source code is installed. For example, new or upgraded application source code 302 is installed on the transaction engine 206A which executes virtual machine 208 and stored in memory storage 305. The virtual machine 208 may execute on transaction engine 206A. As discussed above, application source code 302 may be used to process transactions 202 from applications 110, 112.

At operation 404, an application byte code is generated from the application source code. For example, byte code generator 304 generates application byte code 306 from application source code 302 for the application.

At operation 406, a warm-up data set is received. For example, virtual machine 208 receives transactions 314 that include warm-up data 316. As discussed above, transactions 314 cause compiler 310 of the virtual machine 208 to generate application machine-readable code 312 for sections of the application byte code 306 that are in the execution path of transactions 314.

At operation 408, application byte code is compiled. For example, warm-up data 316 included in transactions 314 may cause compiler 310 to compile sections of application byte code 306 into the application machine-readable code 312. The application machine-readable code 312 may be in the execution path for transactions 202 that are frequently received from applications 110, 112 and maybe used to process transactions 202. Further, the warm-up data 316 may be configured to cause compiler 310 to compile sections of application byte code 306 that are frequently invoked by transactions 202 or that cause hot spots during the processing of transactions 202. In this way, when transaction engine 206 is added to load balancer 204, the transaction engine 206 can process real-world transactions 202 without incurring a time overheard required to compile or interpret application byte code 306 in the real-world environment as described in FIG. 1.

At operation 410, application machine-readable code is stored in a virtual machine. For example virtual machine 208 stores the compiled application machine-readable code 312 in memory storage 305 so that the application machine-readable code 312 may be reused for transactions 202.

At operation 412, a transaction engine that includes the virtual machine is added to a load balancer. For example, transaction engine 206A that includes the virtual machine 208 with compiled application machine-readable code 312 is added to the load balancer 204.

At operation 414, the transactions are processed. For example, transaction engine 206A that is added to the load balancer 204 in operation 412 receives and processes transactions 202 from applications 110, 112. Because virtual machine 208 of transaction engine 206A includes application machine-readable code 312 that is pre-compiled using transactions 314A-N before transaction engine 206A receives transactions 202, transactions 202 may be processed without the time overhead that may be required for virtual machine 208 to otherwise process transactions 202 using interpreter 308 or compiler 310.

Figure 5:
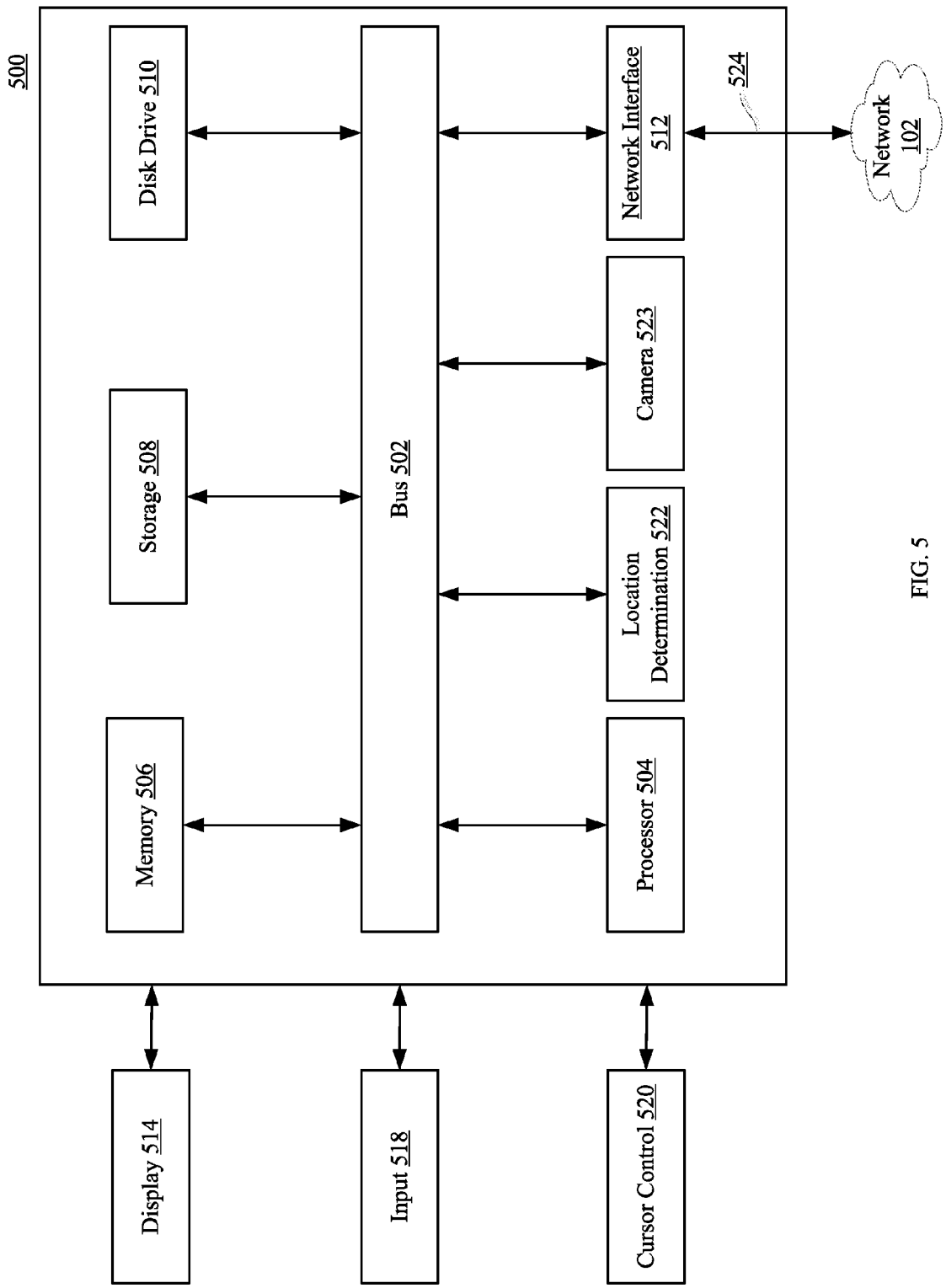
FIG. 5 is a block diagram of a computer system suitable for implementing one or more components in FIGS. 1-4, according to an embodiment.

Referring now to FIG. 5 an embodiment of a computer system 500 suitable for implementing, the systems and methods described in FIGS. 1-4 is illustrated.

In accordance with various embodiments of the disclosure, computer system 500, such as a computer and/or a server, includes a bus 502 or other communication mechanism for communicating information, which interconnects subsystems and components, such as a processing component 504 (e.g., processor, micro-controller, digital signal processor (DSP), graphics processing unit (GPU), etc.), a system memory component 506 (e.g., RAM), a static storage component 508 (e.g., ROM), a disk drive component 510 (e.g., magnetic or optical), a network interface component 512 (e.g., modem or Ethernet card), a display component 514 (e.g., CRT or LCD), an input component 518 (e.g., keyboard, keypad, or virtual keyboard), a cursor control component 520 (e.g., mouse, pointer, or trackball), a location determination component 522 (e.g., a Global Positioning System (GPS) device as illustrated, a cell tower triangulation device, and/or a variety of other location determination devices known in the art), and/or a camera component 523. In one implementation, the disk drive component 510 may comprise a database having one or more disk drive components.

In accordance with embodiments of the disclosure, the computer system 500 performs specific operations by the processor 504 executing one or more sequences of instructions contained in the memory component 506, such as described herein with respect to the mobile communications devices, mobile devices, and/or servers. Such instructions may be read into the system memory component 506 from another computer readable medium, such as the static storage component 508 or the disk drive component 510. In other embodiments, hard-wired circuitry may be used in place of or in combination with software instructions to implement the disclosure.

Logic may be encoded in a computer readable medium, which may refer to any medium that participates in providing instructions to the processor 504 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 510, volatile media includes dynamic memory, such as the system memory component 506, and transmission media includes coaxial cables, copper wire, and fiber optics, including wires that comprise the bus 502. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the disclosure, execution of instruction sequences to practice the disclosure may be performed by the computer system 500. In various other embodiments of the disclosure, a plurality of the computer systems 500 coupled by a communication link 524 to the network 102 (e.g., such as a LAN, WLAN, PTSN, and/or various other wired or wireless networks, including telecommunications, mobile, and cellular phone networks) may perform instruction sequences to practice the disclosure in coordination with one another.

The computer system 500 may transmit and receive messages, data, information and instructions, including one or more programs (i.e., application code) through the communication link 524 and the network interface component 512. The network interface component 512 may include an antenna, either separate or integrated, to enable transmission and reception via the communication link 524. Received program code may be executed by processor 504 as received and/or stored in disk drive component 510 or some other non-volatile storage component for execution.

Where applicable, various embodiments provided by the disclosure may be implemented using hardware, software, or combinations of hardware and software. Also, where applicable, the various hardware components and/or software components set forth herein may be combined into composite components comprising software, hardware, and/or both without departing from the scope of the disclosure. Where applicable, the various hardware components and/or software components set forth herein may be separated into sub-components comprising software, hardware, or both without departing from the scope of the disclosure. In addition, where applicable, it is contemplated that software components may be implemented as hardware components and vice-versa.

Software, in accordance with the disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the disclosure to the precise forms or particular fields of use disclosed. As such, it is contemplated that various alternate embodiments and/or modifications to the disclosure, whether explicitly described or implied herein, are possible in light of the disclosure. Having thus described embodiments of the disclosure, persons of ordinary skill in the art will recognize that changes may be made in form and detail without departing from the scope of the disclosure. Thus, the disclosure is limited only by the claims.

What is claimed is:

1. A system, comprising:
    a non-transitory memory storing instructions; and
    one or more hardware processors coupled to the non-transitory memory and configured to read the instructions from the non-transitory memory to cause the system to perform operations comprising:
        generating an application byte code from an application source code for an application, wherein the application processes a time-sensitive transaction using a virtual machine that is configured to interpret the application byte code;
        receiving warm-up data included in transaction;
        generating an application machine-readable code from sections of the application byte code invoked when processing the warm-up data in the transaction, wherein the warm-up data emulates the time-sensitive transaction and wherein the time-sensitive transaction is a transaction that becomes invalid when transaction processing exceeds a preconfigured processing time;
        subsequent to the generating the application machine-readable code, receiving the time-sensitive transaction; and
        processing the time-sensitive transaction using the application machine-readable code.

2. The system of claim 1, wherein the operations further comprise:
    storing the application machine-readable code in a memory storage accessible to the virtual machine prior to receiving the time-sensitive transaction; and
    retrieving the application machine-readable code from the memory storage to process the time sensitive transaction upon receipt.

3. The system of claim 1, wherein the operations further comprise:
    subsequent to generating the application machine-readable code, adding a transaction engine which hosts the virtual machine to an application loader; and
    receiving the time-sensitive transaction from the application loader.

4. The system of claim 1, wherein the operations further comprise:
    determining that an execution path of a second time sensitive transaction is included in the application machine-readable code; and
    processing the second time sensitive transaction using the application machine-readable code based on the determining.

5. The system of claim 1, wherein the operations further comprise:
    determining that an execution path of a second time-sensitive transaction is not included in the application machine-readable code;
    generating an interpreted code from the application byte code for the execution path of the second time-sensitive transaction; and
    processing the second time-sensitive transaction using the interpreted code.

6. The system of claim 1, wherein the operations further comprise:
    determining that an execution path of a second time-sensitive transaction message in the plurality of time-sensitive is not included in the application machine-readable code generated using the warm-up data;
    generating application machine-readable code from the application byte code for the execution path of the second time-sensitive transaction; and
    processing the second time-sensitive transaction using the generated application machine-readable code for the execution path.

7. The system of claim 1, wherein the transaction is a payment transaction.

8. The system of claim 1, wherein the warm-up data is configured to generate the application machine-readable code for sections of the application byte code that are associated with hot-spots created when processing the time-sensitive transaction.

9. A method, comprising:
    generating, using a processor, an application byte code from an application source code for an application, wherein the application processes a time-sensitive transaction using a virtual machine;
    receiving warm-up data included in a transaction;
    generating an application machine-readable code from sections of the application byte code invoked using the warm-up data in the transaction, wherein the warm-up data emulates the time-sensitive transaction and wherein the time-sensitive transaction is a transaction that becomes invalid when transaction processing exceeds a preconfigured processing time;
    subsequent to the generating the application machine-readable code, receiving the time-sensitive transaction; and
    processing, using the application machine-readable code, the time-sensitive transaction on the virtual machine.

10. The method of claim 9, further comprising:
    storing the application machine-readable code in a memory storage accessible to the virtual machine prior to receiving the time-sensitive transaction; and retrieving the application machine-readable code from the memory storage to process the transaction upon receipt.

11. The method of claim 9, further comprising:
subsequent to generating the application machine-readable code, adding a transaction engine which hosts the virtual machine to an application loader; and
receiving the time-sensitive transaction from the application loader.

12. The method of claim 9, wherein
determining that an execution path of a second time-sensitive transaction is included in the application machine-readable code; and
processing the second time-sensitive transaction using the application machine-readable code based on the determining.

13. The method of claim 9, further comprising:
determining that an execution path of a second time-sensitive transaction is not included in the application machine-readable code;
generating an interpreted code from the application byte code for the execution path of the second time-sensitive transaction; and
processing the second time-sensitive transaction using the interpreted code.

14. The method of claim 9, further comprising:
determining that an execution path of a second time-sensitive transaction is not included in the application machine-readable code generated using the warm-up data;
generating application machine-readable code from the application byte code for the execution path of the second time-sensitive transaction; and
processing the second time-sensitive transaction using the generated application machine-readable code for the execution path.

15. The method of claim 9, wherein the time-sensitive transaction is a payment transaction.

16. The method of claim 9, wherein the warm-up data is configured to generate the application machine-readable code for sections of the application byte code that are associated with hot-spots created when processing the time-sensitive transaction.

17. A system, comprising:
a non-transitory memory storing instructions; and
one or more hardware processors coupled to the non-transitory memory and configured to read the instructions from the non-transitory memory to cause the system to perform operations comprising:
generating an application byte code from an application source code of an application, wherein the application processes a transaction using a virtual machine;
receiving warm-up data;
generating an application machine-readable code from the application byte code using the warm-up data, wherein the warm-up data emulates the transaction;
subsequent to the generating, receiving the transaction, wherein the transaction is configured to time-out after a predefined time period; and
processing, using the application machine-readable code, the transaction on the virtual machine.

18. The system of claim 17, wherein the operations further comprise:
receiving a transaction;
determining an execution path of the transaction is not included in the application machine readable code;
generating interpreted code from the application byte code to process the transaction; and
processing the transaction using the interpreted code.

19. The system of claim 17, wherein the transaction is a payment transaction.

20. The system of claim 17, wherein the operations further comprise:
storing the application machine-readable code in a memory storage accessible to the virtual machine;
subsequent to receiving the transaction, determining that an execution path of the transaction is included in the stored application machine-readable code; and
processing the transaction using the application machine-readable code based on the determination.

* * * * *